UNITED STATES PATENT OFFICE.

JACOB GROSSMANN, OF MANCHESTER, ENGLAND.

METHOD OF MAKING CYANIDS.

SPECIFICATION forming part of Letters Patent No. 671,479, dated April 9, 1901.

Application filed June 20, 1900. Serial No. 21,007. (No specimens.)

*To all whom it may concern:*

Be it known that I, JACOB GROSSMANN, a subject of the Queen of Great Britain, residing at Manchester, in the county of Lancaster, England, have invented a new and useful Improvement in the Manufacture of Alkali Cyanids and Ferrocyanids, of which the following is a specification.

My invention relates to the manufacture of alkali cyanids and ferrocyanids. Researches made by Fleck in 1863 showed that sulfocyanid is formed when sulfate of ammonia is added to a fused mixture of liver of sulfur and carbon. This reaction takes place with great violence, and it was found not to be practicable on a large scale. If, however, instead of using sulfate of ammonia ammonia-gas be passed over a red-hot mixture of potassium sulfid and carbon or of liver of sulfur and carbon, the reaction takes place in quite a different manner. The principal product then formed is potassium cyanid, sulfocyanid being only formed in quite negligible quantities. The greater part of the sulfur passes away as sulfureted hydrogen or ammonium sulfid, respectively. Ammonium cyanid can hardly be shown to exist in the gases which are evolved, not even if instead of ammonia a mixture of ammonia and carbon monoxid be used.

In order to work this process on a large scale, one may proceed as follows: The sulfid of an alkali or its liver of sulfur or ingredients forming an alkaline sulfid at a red heat are mixed with ground or rasped charcoal or other carbonaceous matter. This mixture is placed in retorts which are arranged in such a manner that several retorts are connected together into one set or system, so that the gas or gases which are used in the process—that is to say, ammonia by itself or mixed with other gases—pass from one retort into another and so on into each retort of the set, the temperature in all retorts being kept at red heat. A heat of between 700° centigrade to 800° centigrade is sufficient. Thus when the contents of the retorts have attained red heat the ammonia-gas in excess is passed from an ammonia-still or from a gasometer over the mixture which is contained in the first retort. The excess of the ammonia mixed with other gases which are evolved in the first retort during the process pass into the second retort, &c. The gases which leave the last retort of the set are condensed in the usual manner and reconverted into ammonia-gas according to methods well known. The ammonia used in the process is dried by dephlegmation. It is not necessary to use chemical agents for drying the same. After a sample taken from the first retort shows that the reaction has proceeded sufficiently, as far as the formation of cyanid is concerned, the first retort is disconnected from the system and emptied. Air is excluded during the emptying process, or the retorts may be emptied in an atmosphere of a non-oxidizing gas. The second retort now becomes the first in the system, while the first retort after being charged becomes the last retort of the set and is exposed to the action of the gases last; but it is not coupled into the system again until its contents have reached a temperature of about 700° centigrade.

As regards the charge for the retorts, the qauntities are chosen in such a way that the mass does not cake at red heat. If sulfid is used, about equal parts of sulfid and charcoal may be taken. If working with liver of sulfur, a good proportion will be to take on every one hundred parts of potassium carbonate about one hundred and twenty to one hundred and forty parts of charcoal and twenty-four parts of sulfur. In either case the quantity of charcoal may be reduced. If sodium compounds are used, the proportions may be altered accordingly. Mixtures of potassium and sodium compounds may also be used in this process.

The ammonia may be prepared by any of the known methods. Compressed ammonia may also be used. The ammonia-gas need not be pure. It may contain other volatile ammonia compounds or may be mixed with carbon monoxid, hydrogen, hydrocarbons, or other gases of a non-oxidizing nature, and it may be passed through the retorts at ordinary, diminished, or augmented pressure as compared with the pressure of the atmosphere.

If it is intended to manufacture ferrocyanids, iron-filings or suitable iron compounds may either at the beginning or at the end of the reaction be added to and mixed with the mass contained in the retorts. It is, however, advantageous, even in working for the production of ferrocyanid compounds, to effect the conversion into ferrocyanid outside the retorts from the alkali cyanid which is in the resulting mass. It is therefore more advantageous to lixiviate this mass—i. e., the drawn charge—systematically after it has been cooled in suitable apparatus. From the liquor thus obtained alkali cyanid may either be separated as such or, after treatment with suitable ferrous compounds, as ferrocyanid. The mother-liquor may be evaporated in vacuum-pans or in other suitable manner and the residue returned into the process.

Having now particularly described and ascertained the nature of my said invention and in what manner the same is to be performed, I declare that what I claim is—

1. The herein-described process for the manufacture of alkali cyanids consisting in passing ammonia-gas over a mixture of carbonaceous matter and a sulfid of an alkali at a temperature of from 700° to 800° centigrade, essentially as described.

2. The herein-described process for the manufacture of ferrocyanids consisting in passing ammonia-gas over a mixture of carbonaceous matter and a sulfid of an alkali at a temperature of from 700° to 800° centigrade and adding to the products of reaction suitable iron compounds for the purpose of converting the cyanids first formed into ferrocyanids, substantially as described.

In witness whereof I have hereunto set my hand in presence of two witnesses.

JACOB GROSSMANN.

Witnesses:
WILLIAM EDGAR SIMS,
GEORGE HENRY RATCLIFFE.